(12) United States Patent
Simhon et al.

(10) Patent No.: US 10,423,624 B2
(45) Date of Patent: Sep. 24, 2019

(54) EVENT LOG ANALYSIS

(71) Applicant: HEWLETT PACKARD ENTERPRISE DEVELOPMENT LP, Houston, TX (US)

(72) Inventors: Yonatan Ben Simhon, Yehud (IL); Ira Cohen, Modlin (IL); Eran Samuni, Ramat Gan (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 133 days.

(21) Appl. No.: 15/511,940

(22) PCT Filed: Sep. 23, 2014

(86) PCT No.: PCT/US2014/056963
§ 371 (c)(1),
(2) Date: Mar. 16, 2017

(87) PCT Pub. No.: WO2016/048283
PCT Pub. Date: Mar. 31, 2016

(65) Prior Publication Data
US 2017/0300532 A1    Oct. 19, 2017

(51) Int. Cl.
*G06F 11/07* (2006.01)
*G06F 16/2455* (2019.01)
*G06F 17/27* (2006.01)

(52) U.S. Cl.
CPC .... *G06F 16/24558* (2019.01); *G06F 11/0709* (2013.01); *G06F 11/079* (2013.01); *G06F 11/0751* (2013.01); *G06F 11/0778* (2013.01); *G06F 17/2705* (2013.01)

(58) Field of Classification Search
CPC .............................. G06F 11/07; G06F 11/0709
USPC ........................................................... 714/37
See application file for complete search history.

(56) References Cited

U.S. PATENT DOCUMENTS

| | | | |
|---|---|---|---|
| 7,730,007 B2 | 6/2010 | Salahshour et al. | |
| 7,779,063 B2 | 8/2010 | Gebhart et al. | |
| 8,073,806 B2 | 12/2011 | Garg et al. | |
| 8,095,830 B1 * | 1/2012 | Cohen ................. | G06F 11/0784 714/45 |
| 8,209,567 B2 | 6/2012 | Cohen et al. | |
| 8,626,761 B2 | 1/2014 | Kawai et al. | |
| 2006/0184529 A1 * | 8/2006 | Berg .................... | G06F 11/0709 |
| 2011/0185234 A1 * | 7/2011 | Cohen ................. | G06F 11/3476 714/37 |
| 2011/0208763 A1 * | 8/2011 | McSherry ........... | G06F 21/6245 707/757 |

(Continued)

OTHER PUBLICATIONS

International Searching Authority, The International Search Report and the Written Opinion, dated Apr. 30, 2015, 13 Pages.

(Continued)

*Primary Examiner* — Kamini B Patel (57) ABSTRACT

Method and systems for analyzing event log elements are provided. In one example, a method includes receiving an event log element in a computer. A similarity index is calculated between the event log element and a text element. A threshold of similarity is calculated. The similarity index is compared to the threshold. If the similarity index is greater than the threshold, the event log element is grouped into a cluster with the text element to create a file of cluster assignments.

20 Claims, 4 Drawing Sheets

(56) References Cited

U.S. PATENT DOCUMENTS

| | | | | |
|---|---|---|---|---|
| 2011/0307502 | A1* | 12/2011 | Boctor | G06F 8/37 |
| | | | | 707/758 |
| 2012/0124047 | A1 | 5/2012 | Hubbard | |
| 2013/0152158 | A1 | 6/2013 | Yoshihama | |
| 2014/0058789 | A1* | 2/2014 | Doehring | G06Q 10/067 |
| | | | | 705/7.27 |
| 2014/0122495 | A1 | 5/2014 | Kawai | |
| 2014/0164376 | A1* | 6/2014 | Yang | G06F 17/3071 |
| | | | | 707/737 |
| 2016/0253229 | A1* | 9/2016 | Sade | G06F 11/3476 |
| | | | | 714/37 |
| 2016/0335260 | A1* | 11/2016 | Convertino | G06F 17/3053 |
| 2017/0083390 | A1* | 3/2017 | Talwadker | G06F 11/079 |

OTHER PUBLICATIONS

Vaarandi, Risto, A Data Clustering Algorithm for Mining Patterns From Event Logs, Dec. 9, 2013, 9 pages http://ristov.users.sourceforge.net/publications/slct-ipom03-web.pdf.

Zanoli, et al; Dynamic Threshold for Clustering Person Names; http://www.evalita.it/sites/evalita.fbk.eu/files/working_notes2011/NePS/NePS_FBK.pdf; Retrieved Mar. 16, 2017; 6 pages.

* cited by examiner

EVENT LOG ANALYSIS

BACKGROUND

Various software and computer systems generate event log files, also referred to as logs, which can be used to help analyze the health of a computer system. These logs, which are electronic files that are typically stored on networked servers and systems, can be used in system development and for debugging and understanding the behavior of a system. While logs hold a vast amount of information describing the behavior of systems, finding relevant information within the logs can be very labor intensive. Even modest systems can log thousands of event messages per second.

BRIEF DESCRIPTION OF THE DRAWINGS

Various features and advantages of the invention will become apparent from the following description of examples of the invention, given by way of example only, which is made with reference to the accompanying drawings, of which.

DETAILED DESCRIPTION

The present disclosure provides techniques for automatically diagnosing computer and software issues by analyzing log files. Event log files are electronic files that are systematically generated when software or hardware components output messages. The messages are stored in the event log files as structured or unstructured lists of event log elements. Such event log elements typically describe actions, warnings, or errors experienced by a computer system. Any number of processes can save messages as event log elements into the electronic log files. For example, a failure of a process can cause multiple messages to be stored as event log elements in different electronic log files representing the output of various software components, thereby creating interleaved sequences of events in the respective logs.

Examples disclosed herein provide for automated analysis of the logs for tasks such as automated diagnosis of problems, process identification, or visualization of the information in the logs. Such automation inherently saves time and man hours and helps solve user problems that a particular computer or network may be experiencing. Automated systems can benefit greatly from identification and representation of groups, or clusters, of related events, as opposed to individual messages, as this reduces noise, such as information that is erroneous, meaningless, missing, incomplete, or difficult-to-interpret. The automation also compresses the data and facilitates a more accurate representation of processes in the system.

The event log elements for the network system can be compiled in a number of ways. For example, event log elements can be compiled into so-called "clusters" of message templates. Another compilation method to better organize event log elements includes utilizing those data compiled into clusters to generate sets of atoms from the message templates. Through either example of grouping of the event logs by clusters into message templates, or by generating sets of atoms or "flows," the event log elements can be efficiently translated and compiled into an organized, more machine-readable format.

Systems that cluster messages may use any number of functions to identify similar events. For example, a system may identify words and other parameters in an event log element, and compare the number of parameters to another text element, such as a template representing a cluster, to determine a similarity index. The similarity index can be compared to a threshold, and if the similarity index is above the threshold, the event log element may be added to the cluster. However, the use of a fixed value for the threshold may lead to inconsistent classifications of messages, for example, if the length of messages changes. In examples described herein, the threshold is calculated based on the length of the event log element. Further the calculated threshold may be adjusted to account for differences in lengths between the event log element and the other text elements being compared.

Log analysis involves generating a dictionary of event types that comprise a limited set of templates to represent the events in the logs. The message templates are then used to identify groups of related events, for example, where each group may relate to one kind of system or application software (or a respective component thereof), process or failure. The result is a conversion of system event logs from semi-structured text to a form which can be machine-read and can advantageously be used in various systems analysis, problem solving, and other computer system related tasks, as will be described in further detail.

If the templates for log event messages were known in advance, it would be relatively easy to map each message to its generating template. However, such templates are in practice rarely known in advance. In addition, the number of events with distinct messages in the log files has been found to be represented by between about 10-70% of the total number of events. With millions of events being logged, even automated analysis on the event log time sequence becomes difficult. Another type of behavior has been observed in logs when a system reaches a certain state, then causes different software components to output log entries that are sometimes in an ordered sequence, sometimes in an unordered sequence. Some of the event types always occur when an authentication failure occurs, whereas an additional event is found to occur in other states. In some examples, such processes may be captured and represented as a single template for better characterization of the system behavior. This requires automatically discovering such event sequences from the massive logs, a prerequisite for which is that log events can effectively be compared and matched. The techniques described herein generally relate, but are not limited to system log analysis, and compiling of event log elements into readily identifiable templates. Such templates can be further analyzed and structured into sets of atoms.

Figure 1:
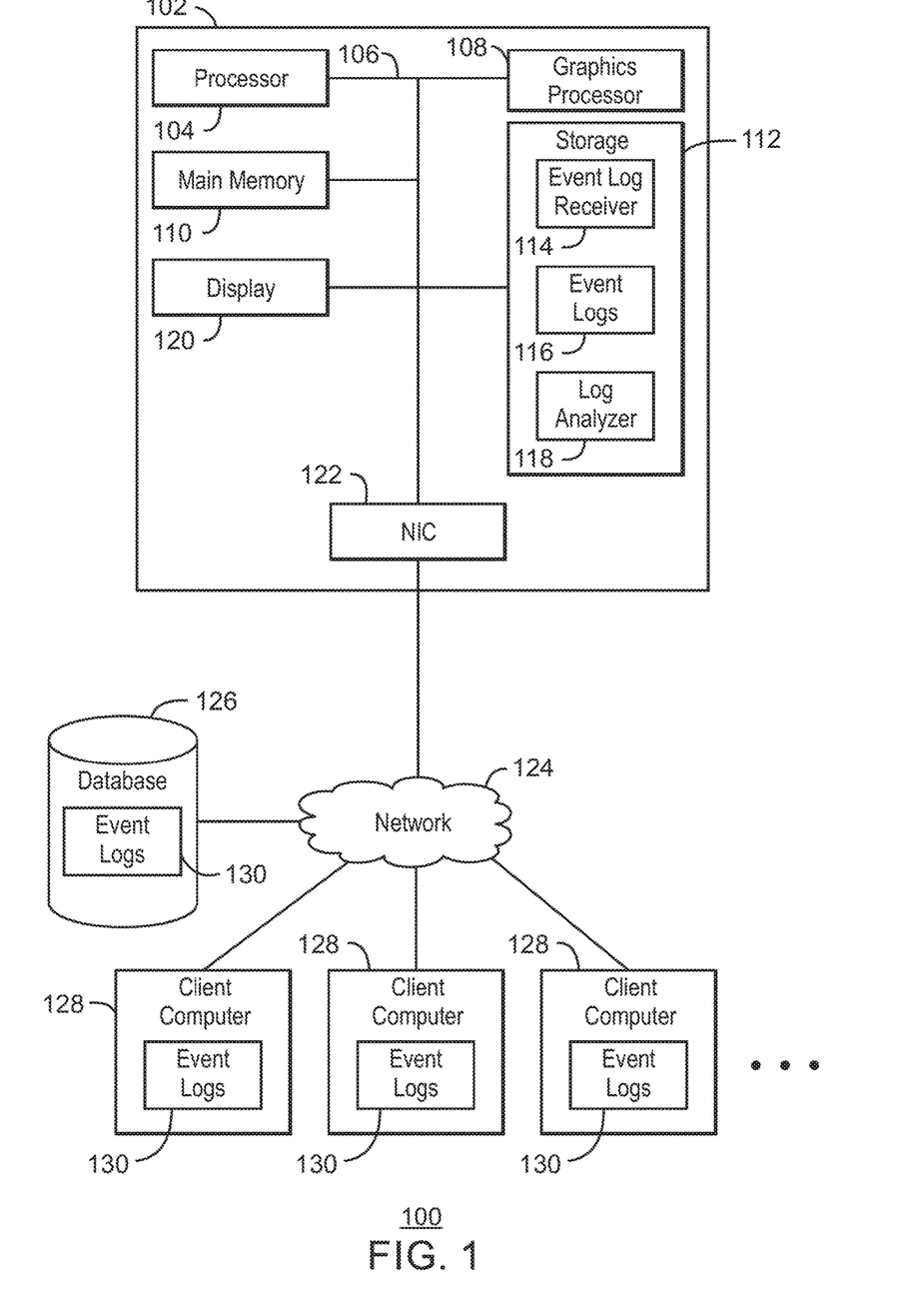
FIG. 1 illustrates a system for analyzing system event logs.

FIG. 1 illustrates a system 100 for analyzing system event logs. The system 100 includes a network management computer system (the network manager) 102 that runs software applications for controlling, monitoring and configuring other network system components. Such network managers 102 are known and may run network management software. The network manager 102 includes a processor 104 connected via a communication bus 106 to a graphics processor 108, main memory 110, a storage system 112, an event log receiver 114, event logs 116, a log analyzer 118, a display 120, and a network interface controller 122 that connects the network manager 102 to a network 124.

The network manager 102 includes one or more processors 104 for executing software. The processors 104 may be single-core, multi-core, or virtual processors. Further, the network manager 102 may include special purpose processors, such as a graphics processing unit (GPU) 108, an audio processor, a digital signal processor, or another processor dedicated for one or more processing purposes. Commands and data from the processor 104 may be communicated over a communication bus 106 with other components in the network manager 102.

The network manager 102 may include a main memory 110 where software is resident during runtime. The main memory 110 can include, for example, dynamic random access memory (DRAM), non-volatile random access memory (NVRAM), or any other kind of RAM. The main memory may also include other types of memory for holding programs and operating systems, such as ROM (read only memory), EPROM (erasable, programmable ROM), EEPROM (electrically erasable, programmable ROM).

The network manager 102 can include a display 114 connected via a display adapter (not shown). User interfaces comprising one or more input devices, such as a keyboard, a mouse, a stylus, and the like may be connected to the network manager 102.

The network manager 102 may also include a storage system 116 to provide longer term storage of code and results. The storage system may include a hard disk drive, a flash drive, a solid-state drive, an optical drive, an NVRAM, or any number of other types of storage systems. The storage system 116 may hold software modules and data that provide functionality to the network manager 102, For example, the storage system may include the event log receiver 111, a log analyzer 112.

The network 124 may be an enterprise intranet, or any other arrangement or combination of one or more network types including the Internet. Connected to the network are a database 126 and client computers 128, which may include personal computers or other processors, such as a server, a network-attached printer, or a network-attached storage device, among others, Any of the devices and systems, e.g., client computers 128 and network databases 126, may generate event logs 130. Typically, the devices and systems are configured to communicate the events to the network manager 102, for example, through the event log receiver 114. The event log receiver 114 stores the received events in one or more event logs 116 on a storage device, such as the storage system 112.

The log analyzer 118 performs the automated techniques described herein, for example, comparing messages to templates, calculating similarity thresholds, and adjusting similarity thresholds based on message length, among others. Additional software components of the network manager 102 and the interactions therein are included, and are discussed in more detail in FIG. 2.

The analysis of particular event logs 130 can be initiated by a user that is experiencing issues with a network of client computers 128, or may be performed automatically over time. The event logs 130 can be compiled by different means, and compared to stored event logs 116 to create clusters of log entries for the analysis. The clusters are groups of similar log entries that make the determination of trends easier.

The clusters can be displayed automatically for the user, significantly reducing time and effort that would otherwise be necessary to troubleshoot computer problems by searching for similar entries in an event logs. The current techniques should be understood to be able to diagnose software issues inherently present within a network of computers. Event log elements from the client computers 128 and database systems 126 can be compared to event log elements, e.g., other text elements such as templates, to determine if they should be included in particular clusters.

Figure 2:
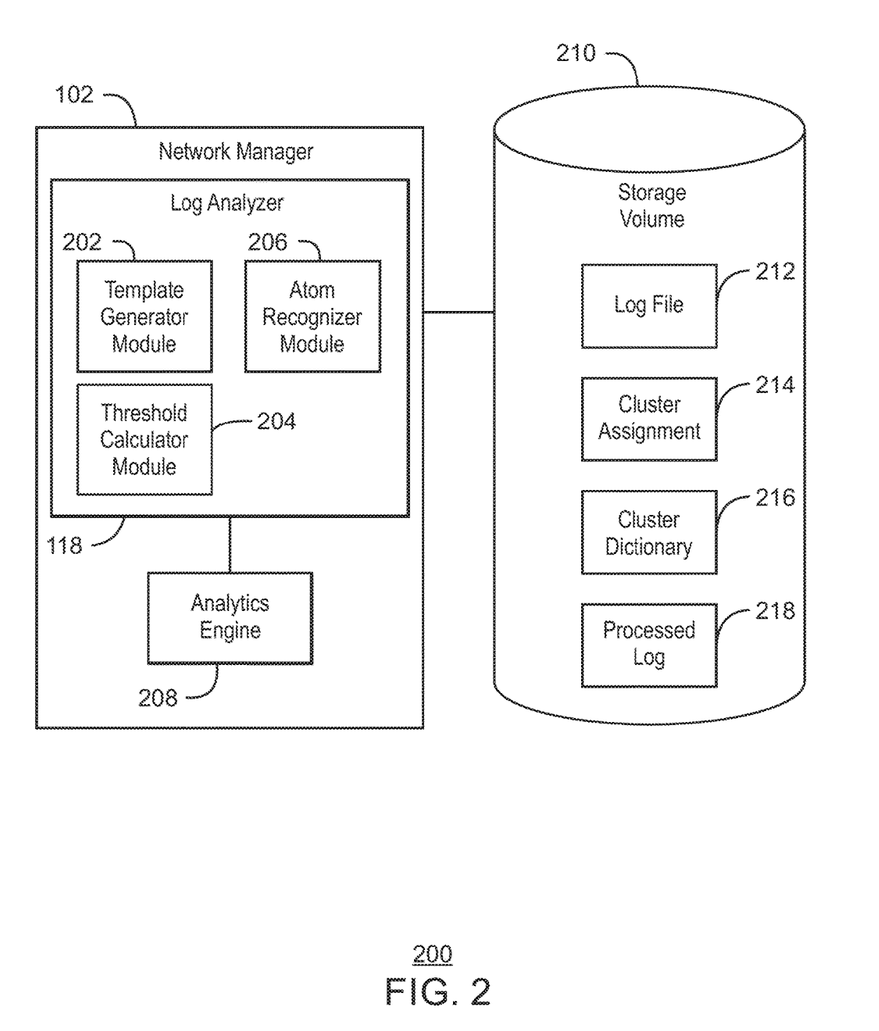
FIG. 2 is a block diagram of a log processing system.

FIG. 2 is a block diagram of a log processing system. The system 200 includes the network manager 102 of FIG. 1, which includes the log analyzer 118. The log analyzer 118 includes a template generator module 202, a threshold calculator 206, and an atom recognizer module 204, and may include other modules to compile and compare event logs. In addition to the log analyzer 118, the network manager 102 also includes an analytics engine 208. The analytics engine 208 and log analyzer 112 have access to storage volume 210, which may be the storage 112 of the network manager 102 or any number of storage devices on the network 122. The data structures stored in the storage volume 210 may include event log files 212, cluster assignment data 214, a cluster dictionary 216, and a processed log 218.

The log analyzer 118 and analytics engine 208 may be implemented as software applications that are loaded into main memory 110 and executed on the network manager 102, The event log files 212 and other data structures (or parts thereof) can be loaded into main memory 110 of the network manager 102 to afford faster read and write operations, and then loaded back into the disk storage volume 210 when read and write operations are completed.

The template generator module 202 of the log analyzer 118 utilizes a cluster dictionary 216 that stores a set of message clusters, wherein each cluster can be represented by a text element that represents a template of the average message in the cluster. To create the cluster dictionary 216, the template generator module 202 applies an assumption that event log elements produced by the same template will match many, or most, of the words, with differences only at various variable parameters.

To determine a similarity of messages with clusters or with other text elements, the template generator module 202 starts by generating a similarity index. Any suitable function may be used to determine the similarity index. For example, in one example, the numbers of shared parameters, or words, in each of the two messages, or text elements, can be determined and divided by the overall number of words. The score may then be compared to the calculated threshold and the new tog message may be added to the cluster, according to the result of the comparison.

In this example, the more words in a message, the higher the threshold may be set. For example, the message "system is up" would have a similarity index with the phrase "system is down" of 66%. At a threshold of 0.6, the two messages would be clustered, while at a threshold of 0.7, the two messages would not be clustered. Accordingly, if the cluster is intended to track system status, such as with an atom text element of "system is", the lower threshold would be More appropriate. In contrast, a long message may have over 200 words. In this case, a higher threshold, for example, 0.9 or higher, may be appropriate to identify sufficient similarity for clustering. The determination of the appropriate value for the threshold (Dt or dynamic threshold) is determined by the threshold calculator 204. This may be performed, for example, using a linear function based on the length of the message. Further, the threshold calculator 204 may adjust the threshold value if the text elements, such as a log error message and a message template, are of different lengths. In one example, the threshold may be adjusted to an intermediate value using the formula shown in Eqn. 1.

$$Adt = Dt\sqrt{n_1 * n_2}$$ Eqn. 1

In Eqn. 1, ADt is the adjusted dynamic threshold, Dt is the dynamic threshold, $n_1$ is the number of words in the first text element, and $n_2$ is the number of words in the second text element.

In one example, a similarity function may take word ordering into account. For example, an order-sensitive cosine similarity function may be applied to provide a similarity index for two messages. Such a function may take the form shown in Eqn. 2.

$$<msg_1, msg_2> = \frac{n_{12}}{\sqrt{n_1 * n_2}}$$ Eqn. 2

In Eqn. 2, $n_{12}$ is the number of identical words comparing each word position of the messages, $msg_1$ and $msg_2$, and $n_1$, $n_2$ are as defined for Eqn. 1, A resulting cosine distance is a number between 0 and 1. When the result is 1, the two messages are identical, and when the result is 0, the two messages are completely different. In another example, an edit distance may be used, allowing for word insertions and deletions.

The cluster dictionary 216 described according to the present example is produced using the template generator module 202. Each cluster in the cluster dictionary 216 includes an event template, which is an average text or parameter cluster representing the messages in the cluster. In some examples, the event template may be an encoded or hashed variant or a pointer to the text in a template database or the like. The cluster also includes a message count, indicating the number of times a message, e.g., a log event text, has been assigned to the cluster.

In some examples, the template generator module 202 may limit the number of words in a template, for example, by calculating the amount of unique different parameters and comparing the amount to the total amount of unique words. The number of unique words may be limited, for example, to 8, 12, or 16, among others, to improve the analysis of very long messages. To identify parameters, the template generator module 202 may use dividers, such as spaces, colons, semi-colons, equal signs, and the like. For example, the word after the divider may be a parameter or numerical variable, while the word or phrase before the divider may be an atom that should be used for a portion for the comparison.

A message template for a cluster is essentially a string of similar text elements where some variable or variables are constant and in common between log event texts assigned to the cluster. For example, a hypothetical error log may read something like, "failed to retrieve the metadata of project 'YYYY' the session authentication has failed." The message template may be, for example, the string of text surrounding and related to the 'YYYY' indication. This text is common for the particular type of error message. One computer on the network of computers might give the 'YYYY' indication, while another could give a different indication, such as 'XXXX' or 'ZZZZ', etc. These can be thought of as variables (i.e., numbers, words, or symbols) in the narrative text of the log event that have been inserted into the message templates. It is useful to be able to quickly organize and recognize these in the message through grouping the log event texts into clusters.

As indicated, the template generator module 202 begins with zero or more clusters defined in the cluster dictionary 216. A first event is then read from the log file 212 and compared with existing templates for clusters to see if the event matches the template in any existing cluster, in one example, the output of template generator module 202 can be thought of as a forest of cluster trees, in which the branches of the tree represent splits based on an entropy criterion, and the tree roots are based on a cosine similarity criterion. The template generator module 202 efficiently indexes the logs, reducing space requirements and significantly speeding up a log search over standard indexing techniques.

The log analyzer 112 may also include an atom recognizer module 206. The atom recognizer module 206 functions by utilizing the clusters that have already been created to generate sets of atoms whereby event log elements can be more efficiently organized by strongly correlated flows.

An atom can be defined as a set of elements that is common in many samples contained in a data set, and therefore is potentially meaningful in some sense. As such, a new or existing set can be sparsely represented using such atoms. An atom recognizer module 206 is used to identify atoms which can be used to sparsely represent a set of documents. The atom recognizer module 206 is executed by the network manager 102, and can take as input data representing a data set to be analyzed, such as data representing a corpus of documents, e.g., raw event logs, event message templates, or other event log elements. The corpus of documents can be provided by a storage volume 210, which comprises, for example, a hard drive disk (HDD). The data from the storage volume 210 is used in a training phase in order to determine a set of representative atoms. Process steps can occur with a computing system such as the network manager 102 as described with reference to FIG. 1. Storage volume 210 can be an integral part of the computing apparatus, or can be remote (as depicted in the exemplary system of FIG. 2).

Following the training phase, each document in the corpus can generally be represented sparsely using these concepts. The representation can be used as an aid in keyword extraction, or concept based retrieval and search for example. Further, the atoms may be used in probabilistic latent semantic indexing, for example, to produce models that capture latent concepts in the clusters and event logs.

In an example, the processed log 218 may be used by the analytics engine 208 to aid in diagnosis of system problems. In most computer systems, indications of problems stem from abnormal measurement values associated with computer system behavior, such as transaction response time or throughput. This behavior information is generally referred to herein as system monitor information. Such measurements are typically made and reported to human operators, e.g., system administrators, by known system and/or network monitoring applications, such as OpenView™ software available from Hewlett Packard® Company and Microsoft NT 4.0 Performance Counters available from Microsoft®. Further, the measurements are recorded in log event files for later analysis.

When monitors indicate a problem, the human operators typically need to discover the root cause, quite often by sifting through huge amounts of unprocessed, semi-structured log files, e.g., raw log files 212. Monitors typically measure system behavior, such as CPU, memory, and network utilization, and may present the respective system monitor information graphically.

In an example, the processed log 218 may be used by the analytics engine 208 for the analysis of log event elements over time for example, to gain a better understanding of the system operation, or to diagnose system problems. Analysis of the log events over time may produce electronic records that detail normal system operations, such as reboots, normal periodic processes, such as database partitions, and abnormal operations. For example, the abnormal events can include processes that are not in control, but are not yet causing detectable problems at the application level. Whereas in the first use case the diagnosis of a specific problem that occurred is a supervised learning problem, the second use case can be unsupervised, leveraging visualization and additional unsupervised techniques for early detection of anomalies or undesirable behavior in networked systems, for example, from patterns of elements in the cluster assignment file. The diagnosis may be an automatic function that provides a report to a user when problematic conditions are detected. The diagnosis function may further provide visual displays and lists of issues. For example, visualization may use messages from system logs following the dictionary creation by the template generator module 202.

An automated method is used for determining a set of atoms which are representative of the content of a body, such as the log files 212 or the cluster assignments 214, among others. In a first stage, an input data set is provided to the atom recognizer module 206 to generate a set of representative atoms. The atoms derived according to the process for the input object, e.g., event log elements, can be used to summarize it, for example, thereby providing a processed log 218. The atoms can be used for document summarization where existing documents, such as the event log elements are summarized using the atoms which have been generated as a dictionary of atoms. The addition of new atoms which better represent the content of the new material can be generated and used to assist in log analysis.

More specifically, this stage of atom generation can be thought of as a training phase in which a user provides a document or corpus of documents as input to the system. The system parses the documents to words, and represents each document by the set of words that are present in the document. Accordingly, each document is a sparse vector (with the size of the vector being the entire dictionary), where there is a "1" in the location of words that are present in the document, and "0" everywhere else. The above-described process is then carried out on the corpus of documents which are now represented as sparse vectors, and the output is a set of atoms, wherein each atom is the size of the dictionary, with "1"s in locations of words included in the atom and "0" everywhere else.

In a representation phase, a user can provide an event log file as an input to the system so that it can be transformed into a sparse vector. Accordingly, the system can then find which atoms from the output best represent the event log file and provide these atoms as the summarization of the document.

Atoms derived according to the present examples can be used in order to define a keyword representative of the content of a data set. Accordingly, an atom or set thereof for a particular document can be provided as keywords for that document which can be used to speed up searching, for example, or otherwise can be used to more simply represent a document. In an exemplary example, an initial data set can represent a user (customer, client, etc.) profile, and can further represent an error indication in the event log, as one example, for that user. Accordingly, a set of atoms generated for the user will therefore provide a representation of the same. It is therefore possible to use the atoms for the user in order to predict an element of interest to troubleshoot that user computer based off the processed element that is compared against the processed elements of other computers in the system.

Information received from a system monitor, indicating failures, can be used in tandem with log analyzer information, in order to diagnose system failures. Once it is known which atoms, or combination of atoms, occur concurrently with or precede system failures, the clusters and processed logs could be used to diagnose recurrences of the problems.

In addition to the modules discussed herein, the log analyzer 118 may also include a storage engine, a comparison engine, a differentiation engine, and a display engine that can be configured to implement the techniques described herein. Each engine includes a combination of hardware and programming. For example, the engine hardware can be a non-transitory, computer-readable medium for storing the instructions, one or more processors for executing the instructions, or a combination thereof.

Figure 3:
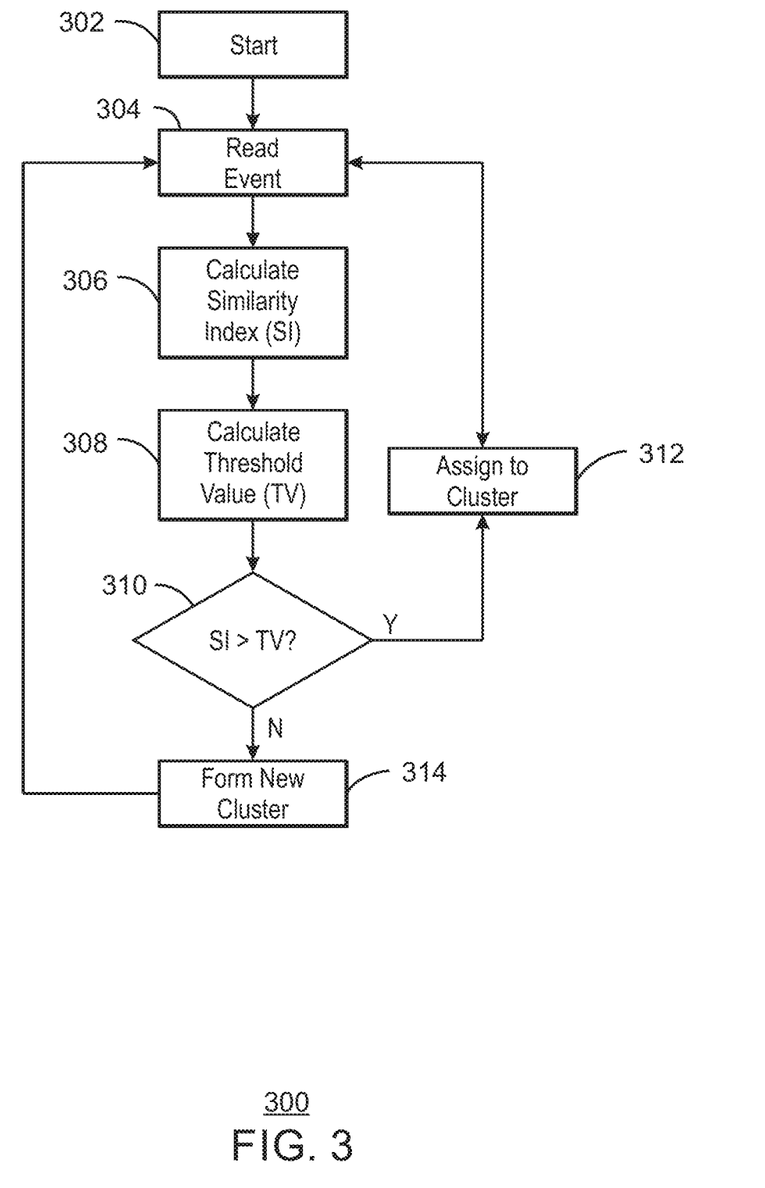
FIG. 3 is a process flow diagram of a method for comparing text elements to create clusters.

FIG. 3 is a process flow diagram of a method 300 for comparing text elements to create clusters. The method 300 starts at block 302 where event logs are received at a computer, for example, a network management computer system 102 (FIG. 1). The event logs 130 may be received from various client computers 128, database systems 126, and the like. The received event logs can be stored and processed further in the storage volume 112 of the network manager 102. The method 300 begins at block 302 with zero or more clusters defined in the cluster dictionary 216 (FIG. 2).

At block 304, a first event is read from the log file. At block 306, a similarity index between the event and a text element, such as a template in the cluster dictionary 216 is calculated. As discussed with respect to FIG. 2, this may be performed by any number of techniques, including a simple comparison of the number of words in common, by using Equation 2, or some combination thereof.

At block 308, a dynamic threshold value is calculated, for example, using a linear fit to the length of the text elements. The dynamic threshold may be adjusted, for example, by the formula in Equation 1, if the text elements are of different length. At block 310, the similarity index may be compared to the dynamic threshold, to see if the event matches the text element, for example, a template in an existing cluster. If the similarity index is greater than the threshold, the event may be assigned to that cluster, as indicated by block 312. This would be recorded, for example, in the cluster assignment 214 in the storage volume 210 of FIG. 2. Over time, the clusters may be reviewed and split, if needed, into new clusters.

If the similarity index is less than the dynamic threshold at block 310, process control proceeds to block 314. At block 314, a new cluster is formed from a template generated from the event. Process flow then returns to block 304 to continue the process.

The method 300 in FIG. 3 is not limited to the blocks or the order shown. In some examples, additional processes may be present. For example, these processes may divide the clusters into additional clusters, increasing the granularity of the analysis. The division may be performed automatically when a certain number of entries are assigned to a cluster, or manually, when a user indicates that an entry would be more appropriately assigned to another, or a new, cluster. Further, the status of the clusters, assignments, atoms, and so forth, may be displayed at any time, automatically or on the request of a use.

Figure 4:
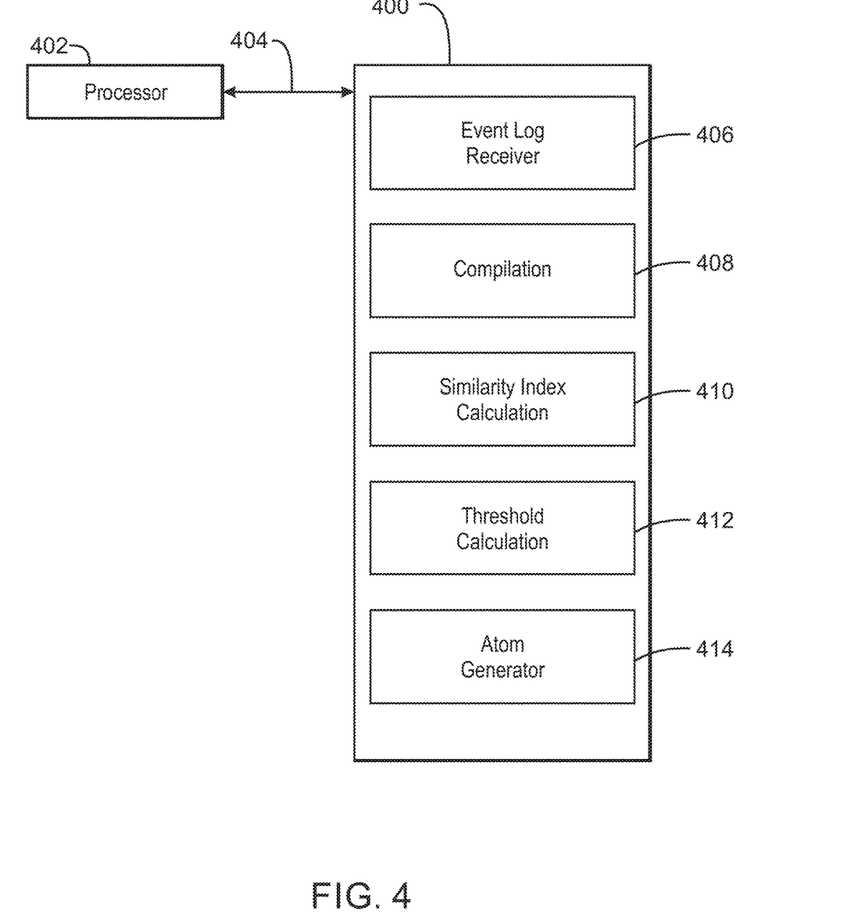
FIG. 4 is a block diagram of a non-transitory, computer-readable medium containing code to implement an event log analysis system.

FIG. 4 is a block diagram of a non-transitory, computer-readable medium 400 containing code to implement an event log analysis system. The tangible, computer-readable medium is referred to by the reference number 400. The tangible, non-transitory, computer-readable medium 400 can comprise a hard disk drive, an array of disk drives, an optical drive, an array of optical drives, a non-volatile memory, a universal serial bus (USB) drive, a digital versatile disk (DVD), or a compact disk (CD), among others. The tangible, non-transitory, computer-readable medium 400 may be accessed by a processor 402 over a computer bus 404. Furthermore, the tangible, non-transitory, computer-readable medium 400 can include code configured to perform the techniques described herein.

A first region 406 can include an event log receiver for receiving the event logs from a computer on the system of computers. Another region 408 can include a compilation module for compiling the event log elements into more organized and more meaningful data, for example, using the clustering techniques described herein. The compilation module may use other modules stored in the non-transitory, computer-readable medium 400.

For example, a region 410 can include a similarity calculation module for calculating a similarity index between an event log elements and another text element, such as a template for a cluster. A region 412 can include a threshold calculator for calculating an appropriate threshold of similarity between text elements, for example, based on the lengths of the events. The non-transitory, computer-readable medium 400 may also include a region 414 used for the generation of atoms, as described herein.

While the present techniques may be susceptible to various modifications and alternative forms, the exemplary examples discussed above nave been shown only by way of example. It is to be understood that the technique is not intended to be limited to the particular examples disclosed herein, Indeed, the present techniques include all alternatives, modifications, and equivalents falling within the scope of the present techniques.

What is claimed is:

1. A method for analyzing an event log, comprising:
    accessing an event log element from an electronic event log file;
    calculating a similarity index between the event log element and a text element;
    calculating a threshold of similarity as a linear function of a length of the event log element;
    calculating an adjusted threshold by dividing the threshold of similarity by a square root of a product of a length of the text element times the length of the event log element;
    comparing the similarity index to the adjusted threshold; and
    if the similarity index is greater than the adjusted threshold, adding the event log element to an electronic file of cluster assignments, the cluster assignments representing a grouping of the event log element into a cluster with the text element.

2. The method of claim 1, comprising diagnosing computer problems by analyzing the file of cluster assignments.

3. The method of claim 1, wherein the text element is a template generated for a cluster of event log elements.

4. The method of claim 1, wherein the similarity index is based, at least in part, on the number of words shared by the event log element and the text element.

5. The method of claim 1, wherein calculating the similarity index comprises comparing parameters extracted from the event log element with the text element.

6. The method of claim 5, comprising limiting the number of parameters to 16.

7. The method of claim 5, comprising identifying dividers in the event log element and extracting parameters based, at least in part, on the dividers.

8. The method of claim 1, comprising dividing the cluster assignments of the generated file based on pre-determined splitting criteria that includes greater than a minimum number of event messages being assigned to a message cluster.

9. A system for analyzing event log elements, comprising:
    a processor; and
    a storage, wherein the storage comprises code configured to direct the processor to:
        access electronic event logs from a network of systems;
        store the electronic event logs in the storage;
        calculate a similarity index between an event log element and a text element;
        calculate a threshold of similarity as a linear function of a length of the event log element;
        calculate an adjusted threshold by dividing the threshold of similarity by a square root of a product of a length of the text element times the length of the event log element;
        compare the similarity index to the adjusted threshold and if the similarity index is greater than the adjusted threshold, writing an entry to a cluster assignment file to indicate that the event log element is part of a cluster with the text element; and
        diagnose problems in a network by automatically identifying patterns in the cluster assignment file.

10. The system of claim 9, comprising:
    a template generator module to direct the processor to create a template representative of an event log element; and
    an atom generator to generate atoms for sparse representation of event logs.

11. The system of claim 9, comprising an analytics engine to process the cluster assignment file and processed event logs.

12. The system of claim 9, comprising a network of client computers, database systems, or both.

13. A non-transitory, computer-readable medium, comprising instructions configured to direct a processor to:
    access an event log element from an electronic event log file;
    calculate a similarity index between the event log element and a text element;
    calculate a threshold of similarity as a linear function of a length of the event log element;
    calculate an adjusted threshold of similarity by dividing the threshold of similarity by a square root of a product of a length of the text element times the length of the event log element; and
    write an entry into an electronic cluster assignment file indicating that the event log element is part of a cluster represented by the text element if the similarity index is greater than the adjusted threshold of similarity.

14. The non-transitory, computer-readable medium of claim 13, wherein the text element is a template generated for the cluster.

15. The non-transitory, computer-readable medium of claim 13, comprising instructions configured to direct the processor to:
    diagnose problems in a network by automatically identifying patterns in the electronic cluster assignment file.

16. The non-transitory, computer-readable medium of claim 13, comprising instructions configured to direct the processor to:
 divide cluster assignments of the electronic cluster assignment file based on pre-determined splitting criteria that includes greater than a minimum number of event messages being assigned to a message cluster.

17. The non-transitory, computer-readable medium of claim 13, wherein the similarity index is based, at least in part, on the number of words shared by the event log element and the text element.

18. The non-transitory, computer-readable medium of claim 13, comprising instructions configured to direct the processor to:
 calculate the similarity index based on a comparison of parameters extracted from the event log element with the text element.

19. The non-transitory, computer-readable medium of claim 18, comprising instructions configured to direct the processor to:
 limit the number of parameters to 16.

20. The non-transitory, computer-readable medium of claim 18, comprising instructions configured to direct the processor to:
 identify dividers in the event log element; and
 extract the parameters based, at least in part, on the dividers.

* * * * *